US011536296B2

(12) United States Patent
Perillo et al.

(10) Patent No.: US 11,536,296 B2
(45) Date of Patent: Dec. 27, 2022

(54) HIGH-DENSITY POWDER PUMP

(71) Applicant: VERNE TECHNOLOGY S.R.L., Milan (IT)

(72) Inventors: Carlo Perillo, Lecco (IT); Lodovico Fiocchi, Sarandi Grande (UY)

(73) Assignee: VERNE TECHNOLOGY S.R.L., Milan (IT)

( * ) Notice: Subject to any disclaimer, the term of this patent is extended or adjusted under 35 U.S.C. 154(b) by 494 days.

(21) Appl. No.: 16/316,656

(22) PCT Filed: Jul. 14, 2017

(86) PCT No.: PCT/IB2017/054284
§ 371 (c)(1),
(2) Date: Jan. 10, 2019

(87) PCT Pub. No.: WO2018/011767
PCT Pub. Date: Jan. 18, 2018

(65) Prior Publication Data
US 2019/0293092 A1  Sep. 26, 2019

(30) Foreign Application Priority Data

Jul. 15, 2016 (IT) .......................... 102016000074328

(51) Int. Cl.
*F04F 1/18* (2006.01)
*F04B 39/16* (2006.01)
(Continued)

(52) U.S. Cl.
CPC .............. *F04F 1/18* (2013.01); *B05B 7/1459* (2013.01); *F04B 1/16* (2013.01); *F04B 7/0275* (2013.01);
(Continued)

(58) Field of Classification Search
CPC .......... B05B 7/1459; B05B 15/55; F04F 1/00; F04F 1/02; F04F 1/18; F04B 1/16;
(Continued)

(56) References Cited

U.S. PATENT DOCUMENTS 6,908,048 B2   6/2005  Di Gioia
9,085,065 B2 *  7/2015  Reilley .................. B24C 9/006
(Continued)

FOREIGN PATENT DOCUMENTS

SU        1736344 A3    5/1992
WO    2005051549 A1    6/2005

OTHER PUBLICATIONS

International Search Report for corresponding application PCT/IB2017/054284 filed Jul. 14, 2017; dated Nov. 8, 2017.
(Continued)

*Primary Examiner* — Dominick L Plakkoottam
*Assistant Examiner* — Charles W Nichols
(74) *Attorney, Agent, or Firm* — Cantor Colburn LLP

(57) ABSTRACT

The present invention concerns a pump for high-density powder transfer. The pump for high-density powder transportation according to the present invention has four-stroke operation, in which four pumping chambers in reality constitute a system of two pairs of chambers in line with each other. This makes it possible to divide the overall flow rate per minute over four tanks. Each of the four tanks has a reduced capacity, to the benefit of the compactness of the pump and the reduction of the loading/emptying times of the single tank, by exploiting the fluid-dynamic principle of
(Continued)

communicating vessels the system of pairs of chambers in line increases the overall powder storage volume, thanks to a constant depression.

5 Claims, 4 Drawing Sheets

(51) Int. Cl.

| | |
|---|---|
| *F04B 25/00* | (2006.01) |
| *F04B 39/10* | (2006.01) |
| *F04B 7/02* | (2006.01) |
| *F04B 53/10* | (2006.01) |
| *F04B 1/16* | (2006.01) |
| *F04F 1/02* | (2006.01) |
| *F04B 9/129* | (2006.01) |
| *F04B 15/02* | (2006.01) |
| *B05B 7/14* | (2006.01) |
| *B05B 15/55* | (2018.01) |

(52) U.S. Cl.
CPC ............ *F04B 9/1295* (2013.01); *F04B 15/02* (2013.01); *F04B 25/00* (2013.01); *F04B 39/10* (2013.01); *F04B 39/16* (2013.01); *F04B 53/10* (2013.01); *F04F 1/02* (2013.01); *B05B 15/55* (2018.02)

(58) Field of Classification Search
CPC ........ F04B 7/02; F04B 7/0266; F04B 7/0275; F04B 9/129; F04B 9/1295; F04B 15/02; F04B 25/00; F04B 25/005; F04B 39/10; F04B 39/1046; F04B 39/121; F04B 39/123; F04B 39/16; F04B 53/10; F04B 53/1072; F04B 53/1075; F04B 53/16
See application file for complete search history.

(56) References Cited

U.S. PATENT DOCUMENTS

| | | | |
|---|---|---|---|
| 2005/0158187 A1* | 7/2005 | Fulkerson | B05B 7/1459 417/390 |
| 2006/0193704 A1* | 8/2006 | Simontacchi | B05B 7/1459 406/88 |
| 2016/0122138 A1* | 5/2016 | Mauchle | B05B 7/1404 406/14 |

OTHER PUBLICATIONS

Written Opinion of the International Searching Authority for corresponding application PCT/IB2017/054284 filed Jul. 14, 2017; dated Nov. 8, 2017.

RU Office Action dated Jul. 14, 2020 re: Application No. 2019102804/12(005105), pp. 1-7, citing: US 2016/122138 A1.

RU Search Report dated Jul. 14, 2020 re: Application No. 2019102804/12(005105), pp. 1-4, citing: US 2016122138 A1, WO 2005051549 A1, U.S. Pat. No. 6,908,048 B2 and SU 1736344 A3.

* cited by examiner

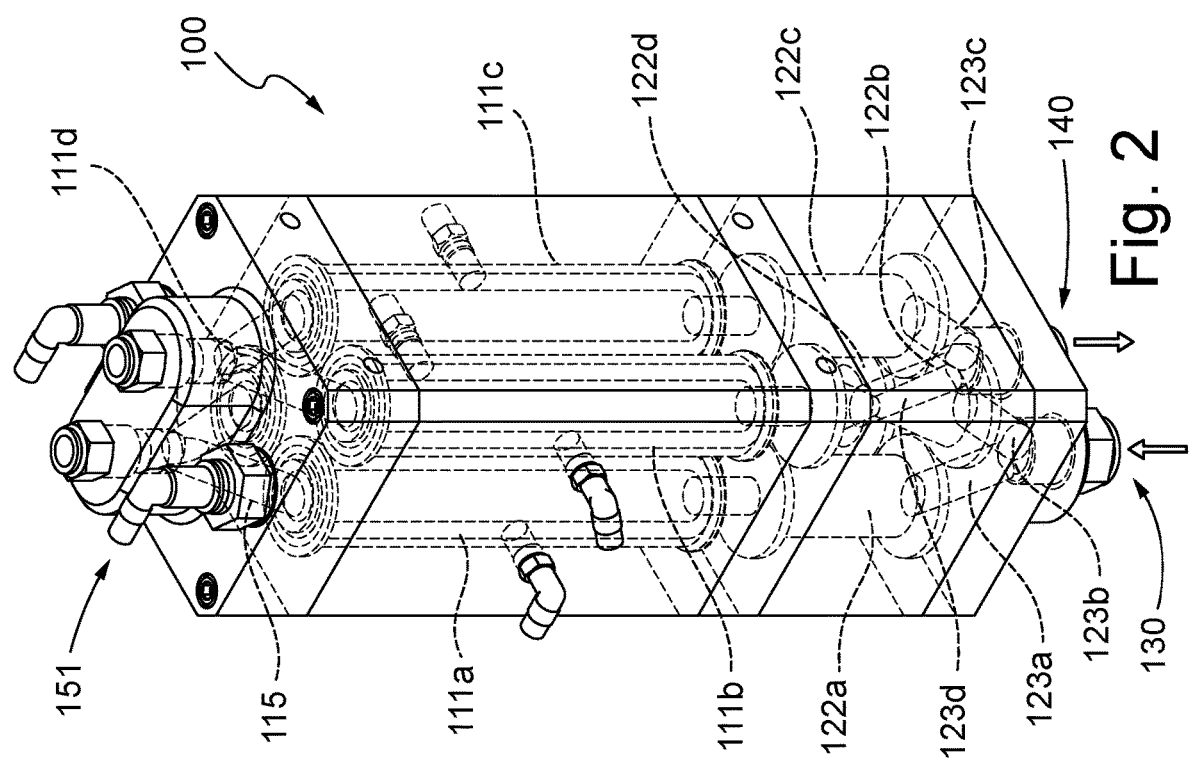
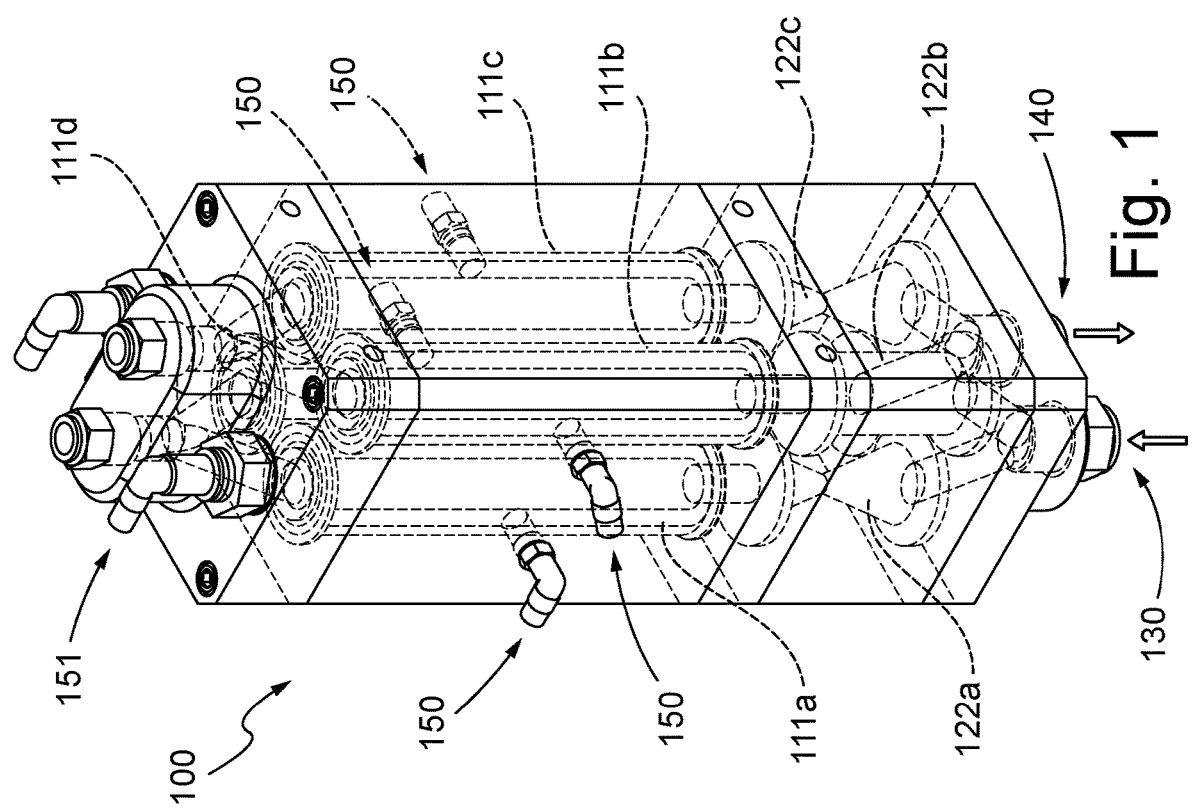

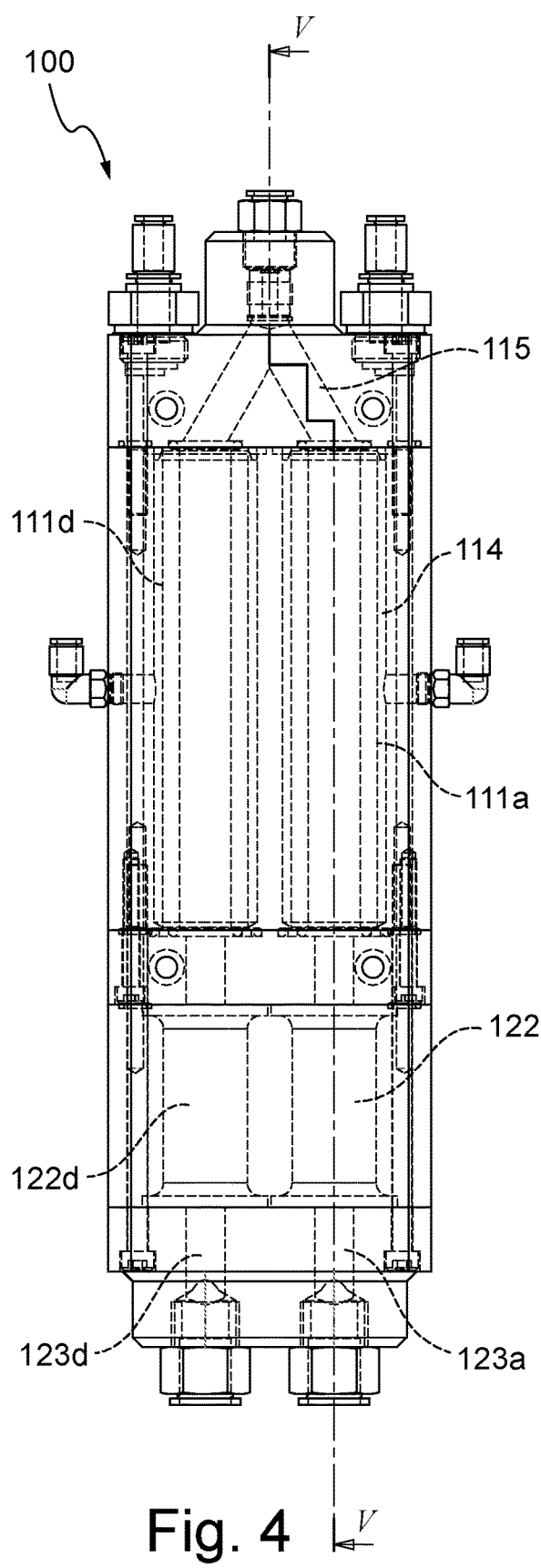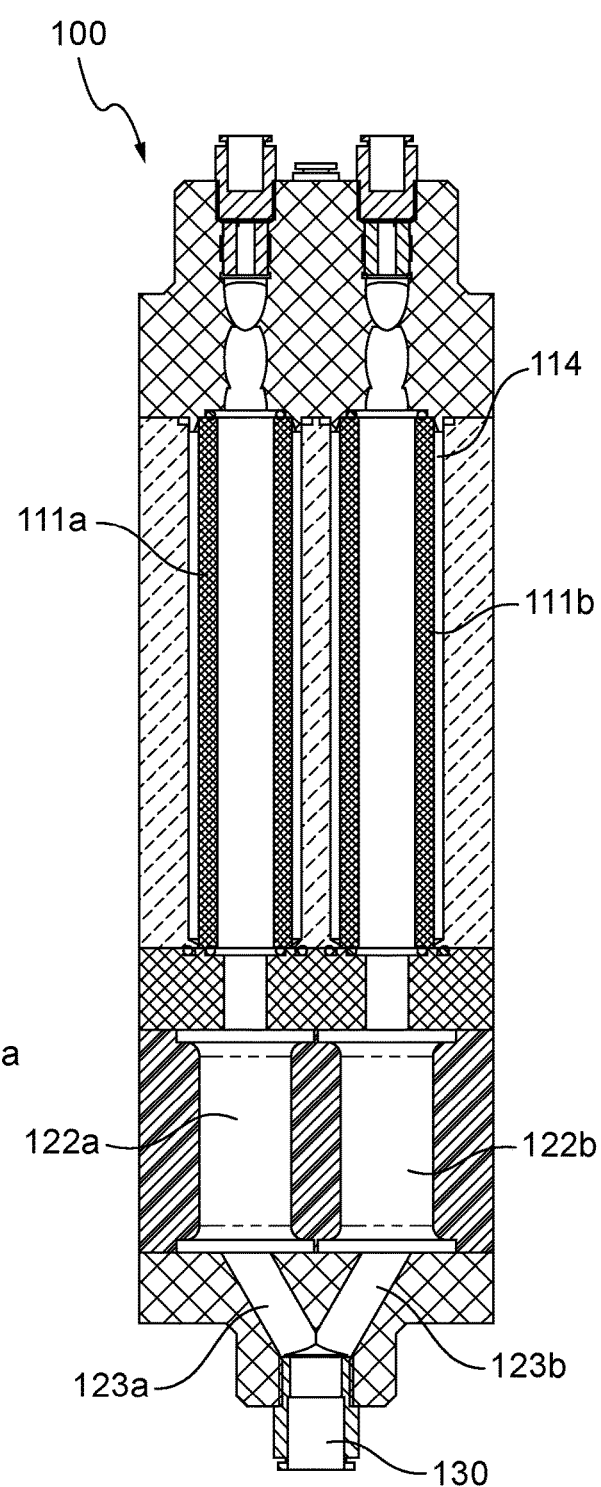
Fig. 4
Fig. 5

HIGH-DENSITY POWDER PUMP

FIELD OF THE INVENTION

The present invention concerns a pump for high-density powder transfer.

The pump according to the present invention is designed to be used in systems for high-density powder transfer, and therefore another object of the present invention is a powder transportation system that comprises the pump according to the present invention.

STATE OF THE ART

In the field of powder transportation through conventional Venturi pumps or high-density systems, for example but not only in industrial painting plants, special dedicated pumps make it possible not only to provide the powder to the paint guns, but also to recover and recirculate the so-called "overspray" powders from the painting chamber.

The term "overspray" is meant to indicate the excessive amount of pressurised gas (air), used to transport a certain amount of powder.

A high percentage of gas (air) used substantially increases the speed of the powder itself since the resulting delivery flow would consist mainly of the gas (air) itself.

In the specific case of powder coating, in the spraying step the powder, even if electrostatically charged, tends to rebound on the piece to be painted or worse it goes past the piece itself. This results in the use of a greater number of guns or, alternatively, reduced production speeds with the consequent rising of production costs.

By its nature, overspraying does not give any benefit to the coating process. In fact, it is a burden since it increases the amount of material that must be disposed of, increases the load of the filters, soils the cabin and increases the emission levels into the atmosphere: its reduction, therefore, can only lead to a saving.

In spray painting the recovery and the possibility of reusing the "overspray" powders is one of the greatest problems, the importance of which becomes clearer when it is considered that the legislation that imposes strict limits to the emission into the atmosphere of powders and the control of waste disposal.

In spray painting processes, a significant percentage, from 30 to 70% of powder coating, is in excess and to fall within the emissions limits it is necessary to cut overspray by conveying the excess powder into suitable powder recovery tanks in general adjacent to the painting chamber.

The high-density pumps that the present invention is classified among can therefore be used both to feed the painting product, the powder, to the painting guns by sucking the powder from a feeding tank, and to transfer the powder from the excess powder recovery tank adjacent to the painting chamber to the feeding tank of the powder to the guns.

For the sake of brevity, reference will therefore be made to the pump object of the present invention with the expression "pump for high-density powder transfer", without, however, thereby wishing to in any way limit the use thereof to only powder transfer operations, instead including among its uses that of feeding a painting gun.

Currently, pumps for high-density powder transfer are known in the state of the art, which use two tanks to process the powder, which operate in a continuous cycle in a two-stroke cycle: while the first tank loads up with powder, the second tank is in the expulsion step. At a subsequent time, the operations in the two tanks reverse, and while the first tank discharges powder the second loads up.

The loading/discharging operations in the two tanks therefore reverse in a continuous cycle according to a time predetermined by the manufacturer of the pump. When using the term pumps for high-density powder transportation, reference is being made to pumps adapted for transporting dry powders, reversing the current gas-powder percentages conventionally required in Venturi pumps, using minimum amounts of gas, a large amount of dense phase powder is transported.

Given the need to process a high flow rate of powders, and therefore given the need to fill the tanks of the pump with a large amount of powder, the known solutions in which the pump foresees a two-stroke cycle that engages two tanks involves excessive powder loading and expulsion times, which translates into pulsed, discontinuous delivery.

The time necessary to discharge the powder from a (loading) tank, is the same necessary for loading the powder in the other (discharging) tank.

Although the cycle is continuous, the powder becomes compacted in the transportation tube and the fact that large amounts of powder are sent, pushed by the pressurised air, causes discontinuous feeding in which two volumes of powder expelled by the pump in two successive steps of the cycle are separated by the presence of air, actually creating a pulsed delivery.

Another drawback of the pumps for high-density powder transfer known from the state of the art is represented by the cleaning system of the pump itself.

Indeed, there is a need in the field to have a deep and complete cleaning of the pump at the time of a change of powder, i.e., for example, in the case in which it is necessary to change the powder to quickly move on to painting with a different colour.

When a change of powder is carried out it is necessary for the pump to be cleaned so as to eliminate any possible residue of the powder used up to that moment.

Pumps known in the state of the art foresee two possible cleaning methods.

According to a first method, pressurised air is introduced into the tanks of the pump from the outside, by means of a dedicated circuit.

This system does not, however, ensure that the cleaning air flow effectively strikes the inner walls of the tanks of the pump, since the air flow is introduced with prevailing axial direction in the tanks of the pump, with the risk that the air flow only tangentially grazes the inner walls of the tanks, which results in very limited cleaning efficiency.

Another drawback of this first cleaning method known in the state of the art concerns the fact that the cleaning air flow, directly mainly axially, undergoes a substantial load loss crossing the tanks of the pump itself. The air, introduced at a pressure of about 6 bar upstream of the powder storage chambers of the pump, finally reaches the ducts of the pump body and of the valves close to the powder introduction and expulsion area with low pressure, and therefore speed. This substantially reduces the cleaning efficiency of the air flow.

Moreover, the fittings between the tanks of the pump and the duct for introducing cleaning air are made of metallic material for sealing purposes, just as the non-return valve provided here is also made of metallic material.

Such metallic materials are therefore in continuous contact with the powder. A second cleaning method known in the state of the art foresees the use of air.

The purpose of the present invention is therefore also that of providing a pump for high-density powder transfer that comprises a self-cleaning device that makes it possible to overcome the drawbacks of known solutions of the state of the art.

SUMMARY OF THE INVENTION

The purpose of the present invention is to avoid the aforementioned drawbacks by providing a pump for high-density powder transfer of the type comprising a main body comprising a valve assembly and a pump body, said valve assembly comprising at least four valves each being configured to selectively close a delivery or powder return duct, said pump body in turn comprising at least four pumping chambers configured to selectively load/discharge powder from/towards the outside, at least one circuit for introducing compressed air in said pumping chambers making a four-stroke pumping cycle.

A further purpose of the present invention is to make a pump for high-density powder transfer, which according to the requirements of the application can be electro-pneumatic or totally pneumatic suitable for use in an ATEX area.

These and other purposes according to the present invention are accomplished by a pump for high-density powder transfer according to claim 1.

Further characteristics of the apparatus according to the present invention are the object of the dependent claims.

LIST OF FIGURES

The characteristics and advantages of the feeding apparatus according to the present invention will become clearer from the following detailed description, given as an example and not for limiting purposes, referring to the attached schematic drawings in which:

FIG. 1 is a perspective view of the high-density powder pump according to the present invention according to a first operative configuration;

FIG. 2 is a perspective view of the high-density powder pump of FIG. 1 in accordance with a second way of operating;

FIG. 4 is a front view of the high-density powder pump according to the present invention;

FIG. 5 is a section view according to the plane b-b of FIG. 4;

DETAILED DESCRIPTION OF THE INVENTION

Figure 3:
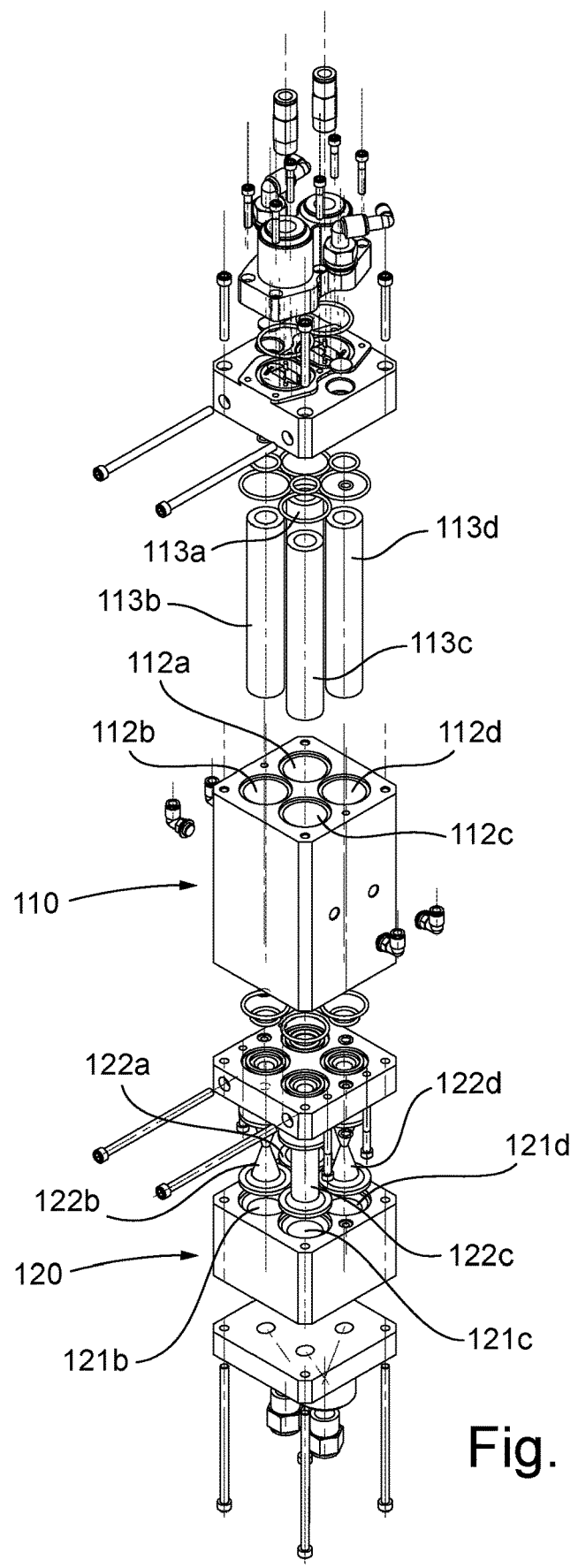
FIG. 3 is an exploded view of the high-density powder pump according to the present invention.
Figure 6:
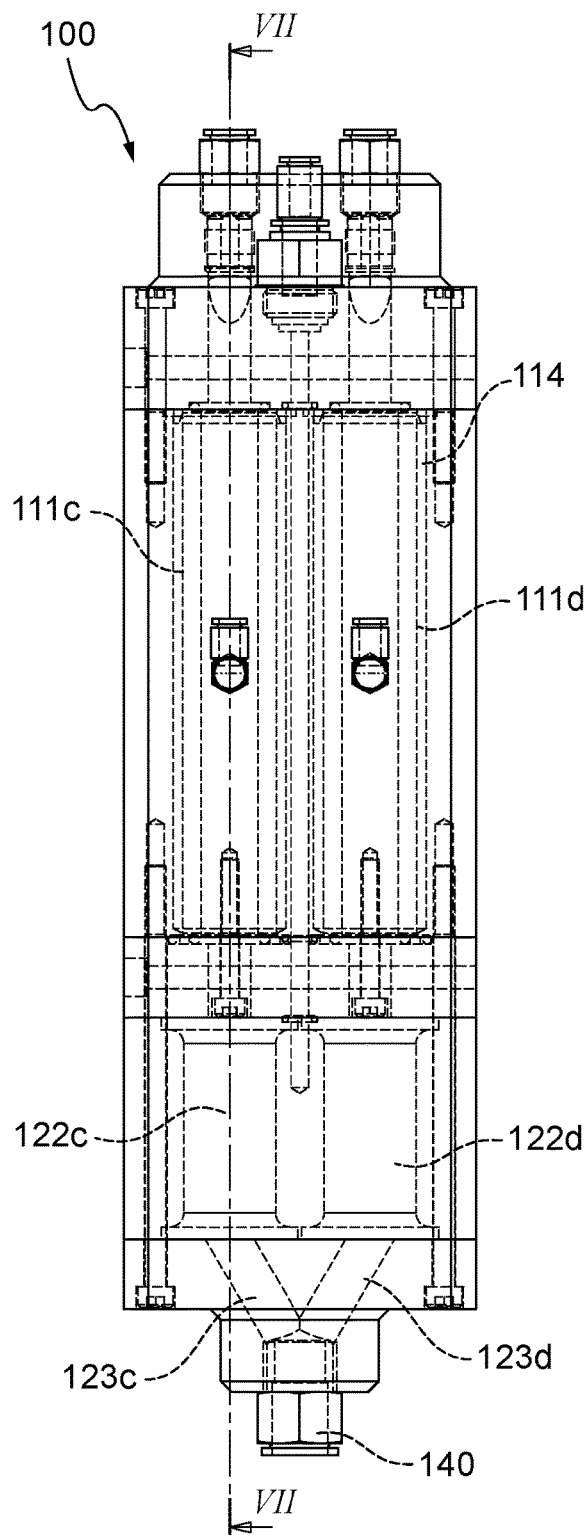
FIG. 6 is a side view of the high-density powder pump according to the present invention.
Figure 7:
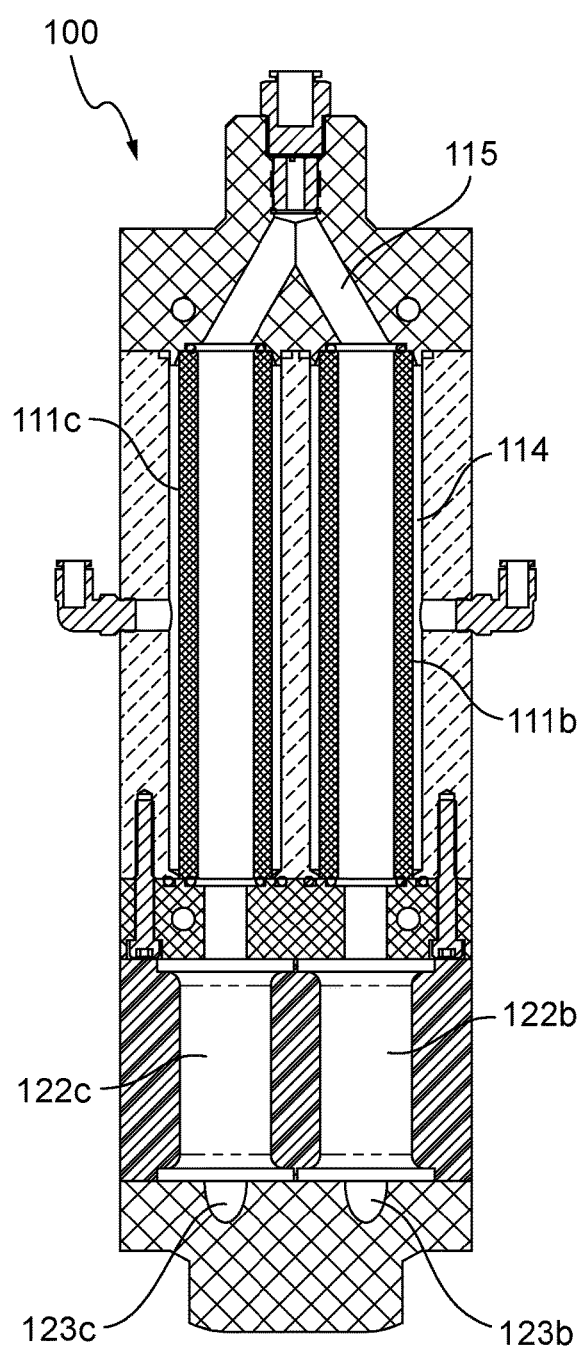
FIG. 7 is a section view according to the plane A-A of FIG. 6.

With particular reference to FIG. 1, the pump 100 according to the present invention preferably comprises at least one pump body 110 and at least one valve assembly 120.

Said at least one pump body 110 in turn comprises at least four pumping chambers 111, and said valve assembly 120 comprises at least four seats 121 for as many valves 122, preferably of the sleeve type, known in the field as "pinch valve".

Said pump body 110 preferably has a box-like structure, preferably parallelepiped-shaped, and is configured to house at least four pumping chambers 111 inside it.

Each pumping chamber preferably comprises a cylindrical hole 112, extending mainly longitudinally, in which a pumping tube 113 also preferably having a cylindrical shape and made of porous materials is inserted.

Said pumping tubes 113, which can preferably be identical to one another, have a wall made of porous material suitable for allowing the passage of air and for preventing the passage of powder, so that air can pass through the wall of the pumping tube 113 but powder is blocked by such a wall.

Possible porous materials that can be used to make the pumping tubes 113 are for example sintered plastics with variable porosity and pores of average size of about 15 micron, or other polymers having analogous characteristics of mechanical filtration of powders.

Said pumping tubes 113 are inserted with clearance in said cylindrical holes 112 of said pump body 110, so that said pumping chambers 111 further comprise an annular port 114 arranged between the outer wall of the tube 113 and the inner wall of the cylindrical hole 112.

A pneumatic chamber 114 is thus made in which it is possible to create, by means of a gas, preferably air, a positive or negative pressure with respect to the pressure present inside the pumping tube 113.

In this way, when by means of the pneumatic circuit 150 with which the pump 100 is equipped a negative pressure is generated in said pneumatic chamber 114, i.e. a pressure lower than the pressure present inside the pumping tube 112, the powder is drawn, through the corresponding valve 122, into the pumping tube 113, when a positive pressure higher than the pressure present inside the pumping tube 113 is generated in said pneumatic chamber 114, the powder present in the pumping tube 113 is expelled, again passing through a corresponding valve 122.

The pneumatic circuit 150 for this purpose comprises at least one fitting 151 for each pumping chamber 111 for the pneumatic connection of each of said pneumatic chambers 114 of said pumping chambers 111 to said pneumatic circuit 150.

In the same way, according to what is known in the state of the art, the pneumatic circuit 150 drives the opening and closing of the pinch valves 122, through a circuit branch 151 dedicated to this.

Said pneumatic circuit 150 is driven by a central control unit, not shown in the figures, which coordinates the action of the valves and of the pumping chambers. Such a control unit is preferably programmable by the user according to different parameters, so as to be able to adjust the flow rate of the pump itself.

In greater detail, and again with reference to the attached figures, the pump 100 according to the present invention comprises a first pumping chamber 111a, a second pumping chamber 111b, a third pumping chamber 111c, and a fourth pumping chamber 111d.

Each of said pumping chambers as stated comprises a first pumping tube 112a, a second pumping tube 112b, a third pumping tube 112c and a fourth pumping tube 112d, respectively.

A first seat 121a, a second seat 121b, a third seat 121c and a fourth seat 121d for as many pinch valves 122 are obtained in said valve assembly 120.

In particular there will therefore be a first pinch valve 122a, a second pinch valve 122b, a third pinch valve 122c and a fourth pinch valve 122d.

In the same way, said first pumping chamber 111a will be in fluid connection with said first pinch valve 122a, said second pumping chamber 111b will be in fluid connection with said second pinch valve 122b, said third pumping chamber 111c will be in fluid connection with said third pinch valve 122*c*, and said fourth pumping chamber 111*d* will be in fluid connection with said fourth pinch valve 122*d*.

Said pinch valves 122 join said pumping chambers 111 directly to the inlet duct 130 and to the outlet duct 140 of said pump.

According to what can be seen in particular in FIGS. 1 and 2 and in the exploded view of FIG. 3, the pump 110 according to the present invention comprises a single inlet duct 130 joined at the bottom to said valve assembly 120 for sucking the powder into the inside of the valve assembly itself, and a single outlet duct 140 also joined at the bottom to said valve assembly 120 for expelling the powder from said valve assembly.

The architecture of the pump 100 according to the present invention is such that two pumping chambers 111 are fluidically connected to said powder inlet duct 130, by means of two pinch valves 122.

In the same way, two pumping chambers 111 are fluidically connected to said powder outlet duct 140, by means of two pinch valves 122.

For this purpose, preferably in the lower portion of said valve assembly 120, below said seats 121 there are connection ducts 123 of said valves to said inlet 130 and outlet 140 ducts.

More specifically, the inlet duct 130 is in fluid connection, through a first connection duct 123*a* and a second connection duct 123*b*, respectively to said first pinch valve 122*a* and to said second pinch valve 122*b*.

Said outlet duct 140 is in fluid connection, through a third connection duct 123*c* and a fourth connection duct 123*d*, respectively with said third pinch valve 122*c* and fourth pinch valve 122*d*.

Therefore, said first pumping chamber 111*a* will be in direct fluid connection with said first pinch valve 122*a* which in turn is in fluid connection with said inlet duct 130.

Said second pumping chamber 111*b* will be in direct fluid connection with said second pinch valve 122*b* which is in turn in fluid connection with said inlet duct 130 by means of said second connection duct 123*b*.

Said third pumping chamber 111*c* will be in direct fluid connection with said third pinch valve 122*c* which is in turn in fluid connection with said outlet duct 140.

Said fourth pumping chamber 111*d* will be in direct fluid connection with said fourth pinch valve 122*d* which is in turn in fluid connection with said outlet duct 140.

Said pumping chambers 111, moreover, are advantageously in fluid connection with each other in pairs.

In greater detail, said first pumping chamber 111*a* is arranged in fluid connection with said fourth pumping chamber 111*d*, and said second pumping chamber 111*b* is in fluid connection with said third pumping chamber 111*c*.

Said pumping chambers are connected together, in pairs, by means of connection ducts 115 arranged above said pumping chambers 111.

According to what is visible for example in the section of the figure.

Given the architecture described up to now, the operation of the pump 110 for high-density powder transfer is as follows.

First Pulse.

The control unit of the pump acts on the pneumatic circuit 150 which creates a suction effect on the third pumping chamber 111*c*.

At the same time the third pinch valve 122*c* associated with said third pumping chamber 111*c* and driven by means of the dedicated branch 151 of said pneumatic circuit 150 is closed, while the second pinch valve 122*b* associated with said second pumping chamber 111*b* is open.

Said second pinch valve 122*b* as stated is in fluid connection, by means of said second connection duct 123*b*, with the inlet duct 130.

The powder is therefore sucked by means of the depression created in the third pumping chamber 111*c* through said second pinch valve 122*b*, crosses said second pumping chamber 111*b* and fills said third pumping chamber 111*c*, which is closed at the bottom by said third pinch valve 122*c* which as stated is closed. The third pumping chamber 111*c* is thus filled by the powder.

At the same time, the pneumatic circuit 150 conveys pressurised air to said fourth pumping chamber 111*d* causing the discharging of the powder previously stored in said fourth chamber 111*d* through said fourth pinch valve 122*d*, which is open.

In this step, the first pinch valve 122*a* and the third pinch valve 122*c* are closed, whereas the second pinch valve 122*b* and the fourth pinch valve 122*d* are open, the third pumping chamber 111*c* fills with powder and the fourth pumping chamber 111*d* empties of powder.

Second Pulse.

In the subsequent step the valves do not change their configuration: the first pinch valve 122*a* and the third pinch valve 122*c* remain closed, and the second pinch valve 122*b* and the fourth pinch valve 122*d* remain open. The third chamber 111*c* stays in the depression state holding the powder previously sucked and sucking the powder through the second valve 122*b*. At the same time depression is introduced into the second chamber 111*b*, which during suction fills with powder through the second valve 122*b*. The third chamber 111*d* is not involved either positively or negatively with the pneumatic circuit 150.

At the same time the pressure applied to the first chamber 111*a* causes the emptying of the first chamber, again through the fourth pinch valve 122*d* connected to the discharge duct 140 since as stated the first valve 122*a* is closed.

Third Pulse.

In this step the configurations of the valves change: the first pinch valve 122*a* and the third pinch valve 122*c* that were previously closed are now open, whereas the second valve 122*b* and the fourth valve 122*d* that were previously open are now closed.

The pneumatic circuit 150 of the pump creates a depression at the fourth chamber 111*d* and creates a positive overpressure at the third chamber 111*c*.

The powder is therefore loaded through said first valve 122*a*, crosses said first chamber 111*a* and fills the fourth chamber 111*d*, with which said first chamber 111*a* is as stated in fluid communication.

At the same time, the pressure applied to the third chamber 111*c* causes the emptying thereof, in fluid connection with said second chamber 111*b*, through said third pinch valve 122*c*.

Fourth Pulse.

In this fourth step the configuration of the valves does not change: the first pinch valve 122*a* and the third pinch valve 122*c* remain open, whereas the second valve 122*b* and the fourth valve 122*d* remain closed.

The fourth chamber 111*d* stays in the depression state, holding the powder previously sucked and sucking the powder through the first pinch valve 122*a*. At the same time, depression is introduced into the first chamber 111*a*, which during suction fills with powder through the first valve 122*a* whereas the overpressure applied to the second chamber 111b causes the emptying thereof through said third pinch valve 122c.

At this point, the starting configuration has been returned to, in which said first chamber 111a and the fourth chamber 111d are loaded and ready to discharge powder according to the configured sequence and in which said second chamber 111b and the third chamber 111c are empty and ready to suck the powder, and the cycle can start again.

The pump 100 for high density powder transportation according to the present invention has four-stroke operation, in which four pumping chambers in reality constitute a system of two pairs of chambers in line with each other.

This makes it possible to divide the overall flow rate per minute over four tanks. Each of the four tanks has a reduced capacity, to the benefit of the compactness of the pump and the reduction of the loading/emptying times of the single tank, but by exploiting the fluid-dynamic principle of communicating vessels the system of pairs of chambers in line increases the overall powder storage volume, thanks to a constant depression.

In this way, a decrease of the flow rate processed by the single tank and an increase of the speed of the exchanges in the work cycle of the pump is obtained, since volumes of powder discharged in succession are discharged quicker, thereby resulting in a greater regularity of the flow of powder delivered, which is more continuous with respect to the known solutions of the state of the art.

The pump 100 according to the present invention therefore makes it possible to fraction the processed flow rate of powder so as to always have, in every step of the cycle, at least two tanks loaded with powder and ready to be discharged, optimising the speed of the exchanges.

Advantageously, the pump 100 for high-density powder transfer according to the present invention also comprises, inasmuch as there is no need to have axial inlets to the pumping chambers for the air of the pneumatic circuit, to provide an innovative cleaning system to proceed to the cleaning of the pump, for example at the time of a powder change, which provides for the axial inlet of a helical air flow, by means of a cyclonic valve.

The innovative cleaning system is the object of a separate patent application to the same Applicant.

From the description given up to here the characteristics of the pump for high-density powder transfer object of the present invention are clear, just as the relative advantages are also clear.

Moreover, it should be understood that the pump thus conceived can undergo numerous modifications and variants, all of which are covered by the invention; moreover, all of the details can be replaced by technically equivalent elements. The materials used, as well as the sizes, can be whatever according to the technical requirements.

The invention claimed is:

1. A pump for high-density powder transfer, comprising a pump body and a valve assembly comprising a plurality of valves, said pump body in turn comprising a plurality of pumping chambers, a pneumatic circuit for actuating said pumping chambers also comprising a dedicated branch for actuating said valves, said pump further comprising a four-stroke operation wherein said pumping chambers are in an even number, fluidically connected together in line in a system of two pairs, wherein said pump comprises a first pumping chamber, a second pumping chamber, a third pumping chamber, and a fourth pumping chamber, wherein said first pumping chamber is in fluid connection, in line, with said fourth pumping chamber, and said third pumping chamber is in fluid connection, in line, with said second pumping chamber, and said pump further comprises a first valve, a second valve, a third valve, and a fourth valve, each of said pumping chambers being in direct fluid connection with a corresponding valve, wherein said first valve and said second valve are in fluid connection, by means of a first connection duct, with a powder inlet duct for the inlet of powder into said valve assembly, and said third valve and said fourth valve are in fluid connection, by means of a second connection duct, with a powder outlet duct for the outlet of powder from said valve assembly.

2. The pump for transferring powders according to claim 1, wherein said pumping chambers each comprise a cylindrical hole in which a pumping tube is inserted, with clearance, so that a pneumatic chamber is defined between said cylindrical hole and said pumping tube.

3. The pump for transferring powders according to claim 2, wherein said pumping tubes of said chambers comprise porous tubes, made of sintered plastic or other polymers having similar characteristics of mechanical filtration of powders.

4. The pump for transferring powders according to claim 1, wherein said valves are pinch valves.

5. The pump for transferring powders according to claim 1, comprising at least one programmable control unit for controlling the actuation of said pump by means of said pneumatic circuit.

\* \* \* \* \*